(12) United States Patent  (10) Patent No.: US 7,503,995 B2
Hayasaka  (45) Date of Patent: Mar. 17, 2009

(54) PEELING APPARATUS AND PEELING METHOD

(75) Inventor: Takuya Hayasaka, Tokyo (JP)

(73) Assignee: Lintec Corporation, Tokyo (JP)

( * ) Notice: Subject to any disclaimer, the term of this patent is extended or adjusted under 35 U.S.C. 154(b) by 613 days.

(21) Appl. No.: 11/362,231

(22) Filed: Feb. 27, 2006

(65) Prior Publication Data

US 2006/0191633 A1    Aug. 31, 2006

(30) Foreign Application Priority Data

Feb. 28, 2005    (JP)    ............................. 2005-052388

(51) Int. Cl.
 *B32B 38/10*    (2006.01)
(52) U.S. Cl. .................. 156/247; 156/344; 156/584
(58) Field of Classification Search .................. 156/247, 156/344, 584
 See application file for complete search history.

(56) References Cited

U.S. PATENT DOCUMENTS

| | | | | |
|---|---|---|---|---|
| 2,170,147 A | * | 8/1939 | Lane | .......................... 206/447 |
| 3,962,176 A | * | 6/1976 | Bernert et al. | ............... 524/227 |
| 5,009,735 A | * | 4/1991 | Ametani et al. | .............. 156/241 |
| 5,972,159 A | * | 10/1999 | Uryu et al. | ................... 156/344 |
| 6,485,596 B1 | * | 11/2002 | Toyoda et al. | ............... 156/232 |
| 6,681,829 B2 | * | 1/2004 | Baccini | ...................... 156/584 |
| 6,715,524 B2 | * | 4/2004 | Chen et al. | .................. 156/540 |

FOREIGN PATENT DOCUMENTS

JP    9-114384    5/1997

* cited by examiner

*Primary Examiner*—Mark A Osele
(74) *Attorney, Agent, or Firm*—Westerman, Hattori, Daniels & Adrian, LLP.

(57) ABSTRACT

A peeling apparatus 10 includes a peeling table 11 for supporting an object D to be peeled off and a peeling unit 12 disposed opposite to the peeling table 11. The peeling unit 12 pays out a peeling tape PT, attaches the peeling tape PT to a film F and forwards the same, and thereby sequentially peels off the films F from plural objects D. A peeling head 22 of the peeling unit 12 attaches the peeling tape PT to an end area of the film F, and then forwards the peeling tape PT so as to overlap with a different film F that has been peeled off just before the film F; thereby peels off the film F from the object D.

4 Claims, 7 Drawing Sheets

PEELING APPARATUS AND PEELING METHOD

BACKGROUND OF THE INVENTION

1. Field of the Invention

The present invention relates to a peeling apparatus and a peeling method, and in particular, to a peeling apparatus and a peeling method capable of eliminating waste of peeling tape necessary for peeling off a film.

2. Description of the Related Art

As a peeling method of a film stuck on the surface of an object to be peeled off having a plate-like shape, such a method has been conventionally known as, for example, a type disclosed in a patent document 1 (Japanese Patent Application Laid-Open No. Hei 9-114384). According to the patent document, a peeling tape is attached to the film via a roller and wound; thereby the film is peeled off from the object. Here, the roller is arranged so as to move along the direction of a diagonal line of the film, and thereby the film and peeling tape are attached to each other along the direction of a diagonal line.

However, according to the peeling method, the length of the peeling tape necessary for peeling off a sheet of film is substantially identical to the diagonal length of the film. Accordingly, when peeling plural objects, such length of peeling tape is required as the number of the objects multiplied by a length of the diagonal length. Therefore, there resides such a disadvantage that, when peeling a large number of objects, the peeling tape used therefor becomes extremely long. As a result, there arises such a disadvantage that the number of replacements of the roll for supplying the peeling tape is increased, not only the work and time required for the replacement become considerably large but also the resources are consumed wastefully accordingly.

SUMMARY OF THE INVENTION

The present invention has been made in view of the disadvantage. An object of the present invention is to provide a peeling apparatus and a peeling method capable of eliminating waste of the peeling tape to attach to the film.

To achieve the object, the present invention is a peeling apparatus, which includes: a peeling table for supporting an object to be peeled off, a film being stuck thereto; and a peeling unit disposed opposite to the peeling table; the peeling apparatus being capable of sequentially peeling off each film from plural objects by attaching a peeling tape paid out from the peeling unit to the film and thereby forwarding the same, wherein the peeling unit includes a peeling tape supply section, a peeling tape winding section and a peeling head relatively movable with respect to the peeling tape between the supply section and the winding section, and the peeling head is arranged so as to move relatively with respect to the peeling tape after attaching the peeling tape to an end area of the film, so that the film is overlapped with a different film, which has been peeled off just beforehand, and to be able to forward the film.

In the present invention, the peeling head is preferably arranged, when peeling off the film, so as to forward a peeling tape while moving from one end side toward the other end side of the film; and before the peeling off operation of the film, to move from the other end side toward the one end side of a different film, which has been peeled off just beforehand and to be capable of attaching an adjacent peeling tape to the one end side of the film.

Also, the present invention employs a peeling method, in which a peeling tape is attached to each of films stuck on plural objects to be peeled off and each of films is sequentially peeled off, comprising the steps of:

attaching the peeling tape to an end area of the film using a peeling head; and thereafter causing the peeling head and the object to perform a relative movement to each other so that the film peeled off is overlapped with a different film just beforehand peeled off, and forwarding the peeling tape; and thereby peeling off the film from the object.

The peeling method preferably employs such a method that, when peeling off the film, the peeling head moves from one end side to the other end side of the film to forward the peeling tape, and before peeling off the film, the peeling head moves from the other end side to the one end side of a different film, which has been peeled off just beforehand, and subsequently the peeling head attaches the peeling tape adjacent to the one end side of the different film to the one end side of the film not peeled off yet from the object.

According to the present invention, the film to be peeled off is arranged to have an area attached to the peeling tape and an area overlapped with a different film that has been peeled off just beforehand, and peeling operation can be carried out while the overlapped area is not attached to the peeling tape. Accordingly, compared to the conventional type, the peeling tape length can be reduced by the length equal to that of the overlapped areas. Owing to this, the number of the films that can be peeled off per unit length of a peeling tape is increased. Even when peeling off a large number of objects, the number of replacements of the roll for supplying the peeling tape can be reduced.

Also, the peeling tape adjacent to the one end side of the different film peeled off just beforehand, is attached to one end side of the film that is not peeled off yet. Therefore, the peeling tape can be attached only in a limited area, like a spot. Owing to this, the waste of the peeling tape can be easily reduced.

DETAILED DESCRIPTION OF THE PREFERRED EMBODIMENT

An embodiment of the present invention will be described below with reference to the accompanying drawings.

Figure 1:
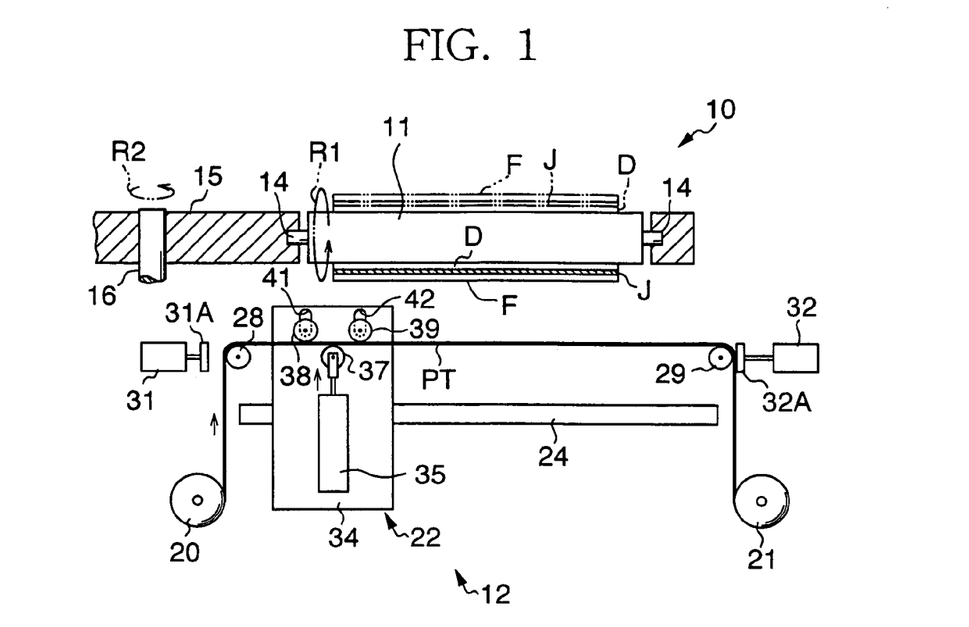
FIG. 1 is a front view schematically showing a peeling apparatus according to an embodiment of the present invention.

FIG. 1 is a front view schematically showing a peeling apparatus according to the embodiment. Referring to FIG. 1, the peeling apparatus 10 includes a peeling table 11 for supporting an object D to be peeled off and a peeling unit 12, which is disposed below the peeling table 11 opposite thereto. Here, the object D to be peeled off is, although not particularly limited to, an optical disk such as DVD. On the opposite side (open face) of the support face of the object, a resin layer J formed with pits for storing information, and a protection film F for protecting the same are stuck thereon.

The peeling table 11 is formed with many suction holes in the lower face side in FIG. 1 and is arranged so as to be able to suck and support the object D. An index table 15 supports the peeling table 11 via shaft members 14 at both right and left end sides as shown in FIG. 1. The peeling table 11 is arranged so as to be able to turn in the direction of the arrow R1 in FIG. 1 by means of a rotation mechanism (not shown) to position the face formed with suction holes upward and downward. The index table 15 is arranged so as to be able to rotate by a predetermined angle in the direction of the arrow R2 around a rotation shaft 16 in FIG. 1. Here, although FIG. 1 shows only one peeling table 11, a plurality of peeling tables 11 having substantially the identical structure are provided in the index table 15 along the direction of the arrow R2. And a series of operations are carried out after the index table 15 turns a predetermined angle. FIG. 1 shows a process in which the protection film F is peeled off from the object D, having a resin layer J and the protection film F for protecting the same, which are stuck thereto. The peeling table 11 may be arranged so that, in place of forming the suction holes, a porous member is disposed to suck and support the object D.

The peeling unit 12 peels off the film F from the object D supported by the peeling table 11. The peeling unit 12 includes a support roll 20, which is positioned below the peeling table 11 and constitutes a supply section of the peeling tape PT, a winding roll 21 constituting the winding section of the peeling tape PT, a peeling head 22 that attaches the peeling tape PT to the film F and peels off the film F therefrom and a slider 24 that moves the peeling head 22 along the direction of the face of the object D (in the right/left direction in FIG. 1). The support roll 20 and the winding roll 21 are respectively connected to the output shafts of motors (not shown in the FIG. 1). The motor for the winding roll 21 is arranged so as to be able to drive the same to rotate in the winding direction of the peeling tape PT, while imparting a rotation force to the peeling tape PT in the direction opposite to the pay out direction thereof so as to give a small tension to the peeling tape PT. Between the support roll 20 and the peeling head 22, a first guide roll 28 is provided; and between the winding roll 21 and the peeling head 22, a second guide roll 29 is provided. Provided beside the first and second guide rolls 28 and 29 are cylinders 31 and 32, which constitute breaking means respectively. Provided to the front end sides of rods of the cylinders 31 and 32 are press members 31A and 32A respectively so as to be able to impart nipping force to the peeling tape PT between the press members 31A and 32A and the guide rolls 28 and 29.

The peeling head 22 includes a head body 34 supported by the slider 24, a cylinder 35 mounted on the head body 34, a first roll 37, which is attached to the front end side of a rod of the cylinder 35 and is capable of moving up/down in the direction closer to and away from the peeling table 11 via the cylinder 35, a second roll 38 provided between the first roll 37 and the first guide roll 28, and a third roll 39 provided between the first roll 37 and the second guide roll 29. The first to third rolls 37 to 39 pay out the peeling tape PT therebetween, and owing to this paying out operation, relative movement between the peeling tape PT and the peeling head 22 is made possible. The first roll 37 imparts a predetermined press force to the peeling tape PT to attach the same to the lower face of the film F (refer to FIG. 2). The rotation shafts of the second and third rolls 38 and 39 are inserted into slot holes 41 and 42 respectively. The second and third rolls 38 and 39 are energized by energizing means such as a spring (not shown) or its own weight so that the rotation shafts are positioned at the lower limit positions of the slot holes 41 and 42 respectively in a state that no load is applied to the rotation shafts.

Incidentally, the rotation shaft 16, support roll 20, winding roll 21, slider 24 and cylinders 31 and 32 are supported at predetermined positions by means of frames (not shown) respectively.

Next, a peeling method in this embodiment will be described.

Here, as shown in FIG. 1, an object D to be peeled off (refer to an item drawn with chain double-dashed line in the figure), which is supported by the peeling table 11 and has a resin layer J and a protection film F for protecting the same stuck on the opposite side of the supporting surface, is placed on the peeling table 11 and sucked so as to be supported thereby. Then, the peeling table 11 is turned in the direction of the arrow R1 by a rotation mechanism (not shown) to dispose the object D with its face down as shown in FIG. 1. The peeling tape PT is laid along a predetermined path between the support roll 20 and the winding roll 21, while the peeling tape PT is nipped at the second guide roll 29 via the cylinder 32 to hold the peeling tape PT and to prevent its movement toward the winding reel 21. Also, the peeling head 22 is arranged so that the first roll 37 is positioned substantially immediately below the one end side (left end side in FIG. 1) of the film F.

Figure 2:
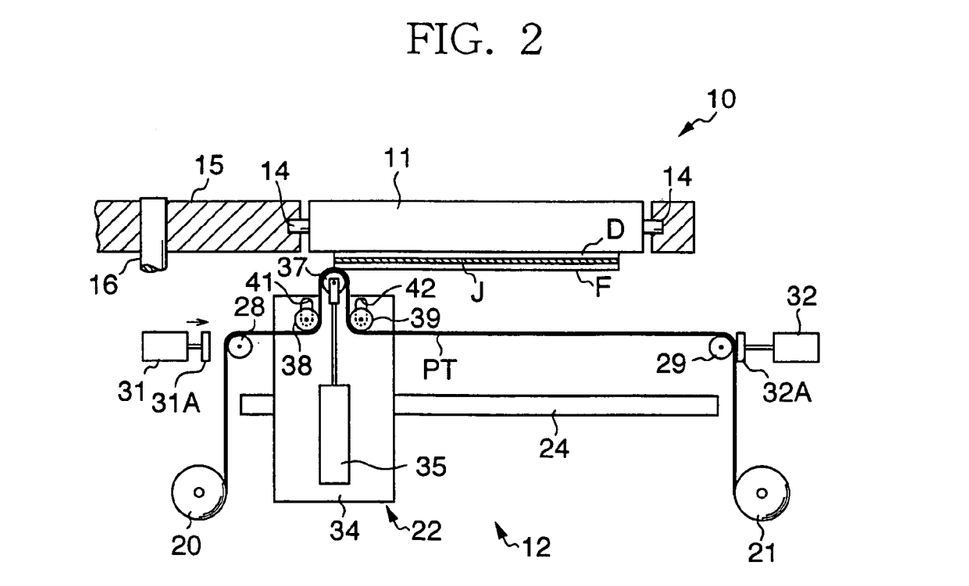
FIG. 2 is a front view showing an initial state in which a first film and a peeling tape are being attached to each other.
Figure 3:
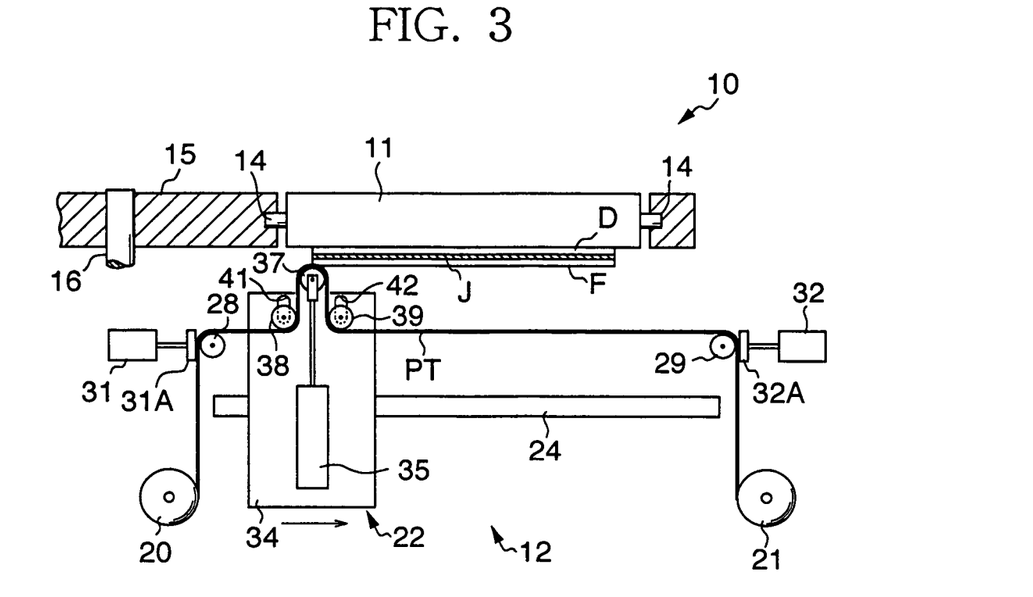
FIG. 3 is a front view showing a state in which a holding point of peeling tape has been changed from the state shown in FIG. 2.
Figure 4:
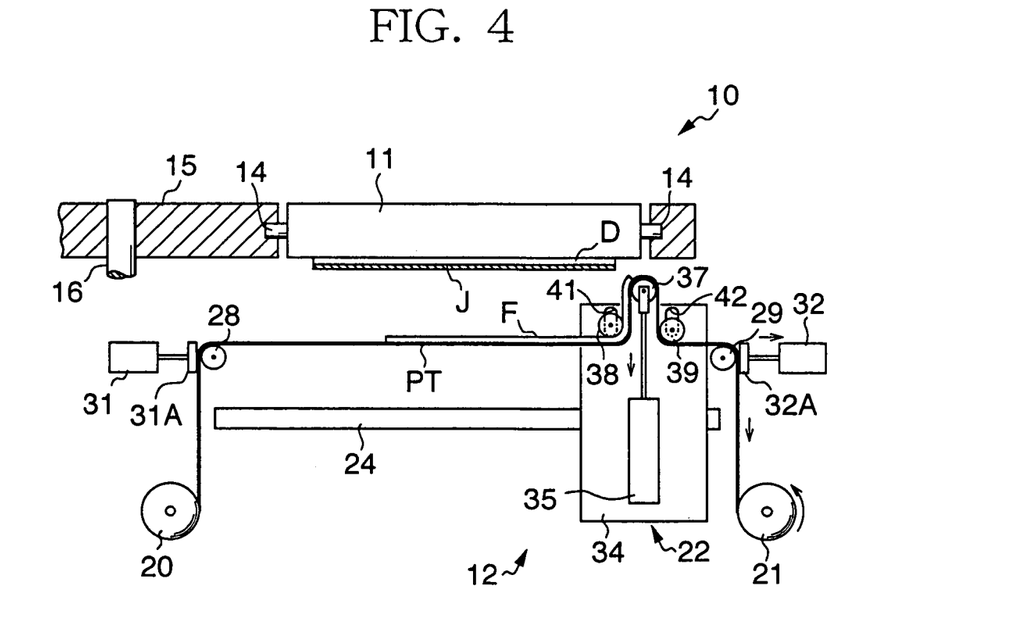
FIG. 4 is a front view immediately after the first film has been peeled off.
Figure 5:
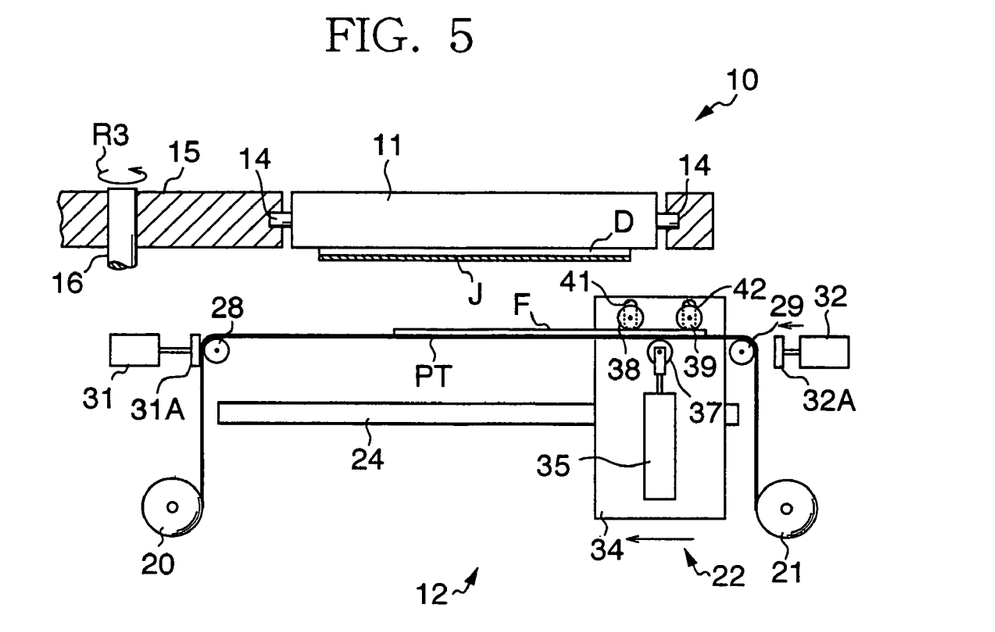
FIG. 5 is a front view showing a state in which the peeling tape has been laid substantially horizontal after the state shown in FIG. 4.
Figure 6:
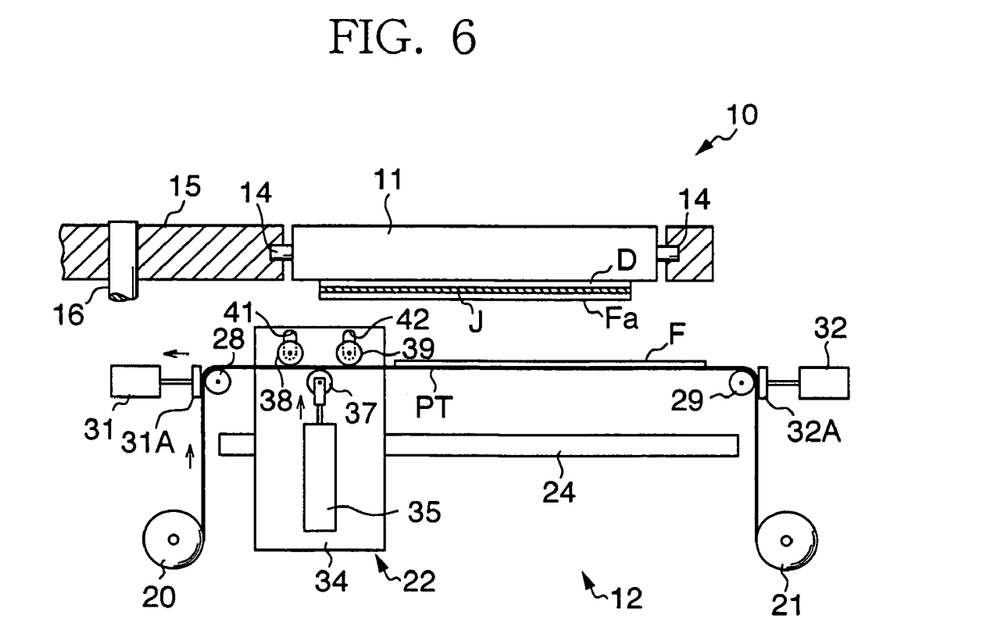
FIG. 6 is a front view showing a state in which the peeling apparatus is ready for peeling operation of the second film.

The peeling operation of the film F on the first object D is carried out as follows. Firstly, as shown in FIG. 2, the first roll 37 is raised via the cylinder 35 and thereby the peeling tape PT is paid out from the support roll 20. Owing to this, the peeling tape PT is made to run with a part thereof facing down in a U-like shape, and the upper portion thereof is pressed against an area in one end side of the film F via the first roll 37 and is attached thereto. In this state, a tension is imparted to the peeling tape PT with a small force in the direction opposite to the pay out direction of the peeling tape PT by a motor for the support roll 20 (not shown in the figure). After that, at the first guide roll 28, the peeling tape PT is nipped via the cylinder 31 (refer to FIG. 3). Then, the peeling head 22 is moved via the slider 24 in the right direction in FIG. 3, and thereby the first roll 37 rotates to move from the one end side of the film F to the other end side (from the left end side to the right end side in FIG. 3). At the same time, the peeling tape PT is paid out among the first roll 37, the second roll 38 and the third roll 39; thus the film F is peeled off while being attached to the peeling tape PT (refer to FIG. 4). When the film F has been completely peeled off from the object D, the movement of the peeling head 22 is stopped, the nip of the peeling tape PT by the cylinder 32 and the second guide roll 29 is released, and the first roll 37 is lowered while winding the peeling tape PT with the winding roll 21 so that the peeling tape PT between the first guide roll 28 and the winding roll 21 is kept substantially horizontal without being loosen (refer to FIG. 5). Then, the index table 15 turns in the direction of the arrow R3 in FIG. 5, and the peeling table 11, which is sucking and supporting another object D to be peeled off, is set above the peeling head 22 (refer to FIG. 6). In this state, after nipping the peeling tape PT with the second guide roll 29 and the cylinder 32, the peeling head 22 is moved towards the one end side direction of the film F attached to the peeling tape PT; i.e., in the left direction in FIG. 5. Thus, the first roll 37 is set substantially immediately below the one end side of the film F (left end side in FIG. 5) of the object D, which is being sucked and supported by the peeling table 11.

Figure 7:
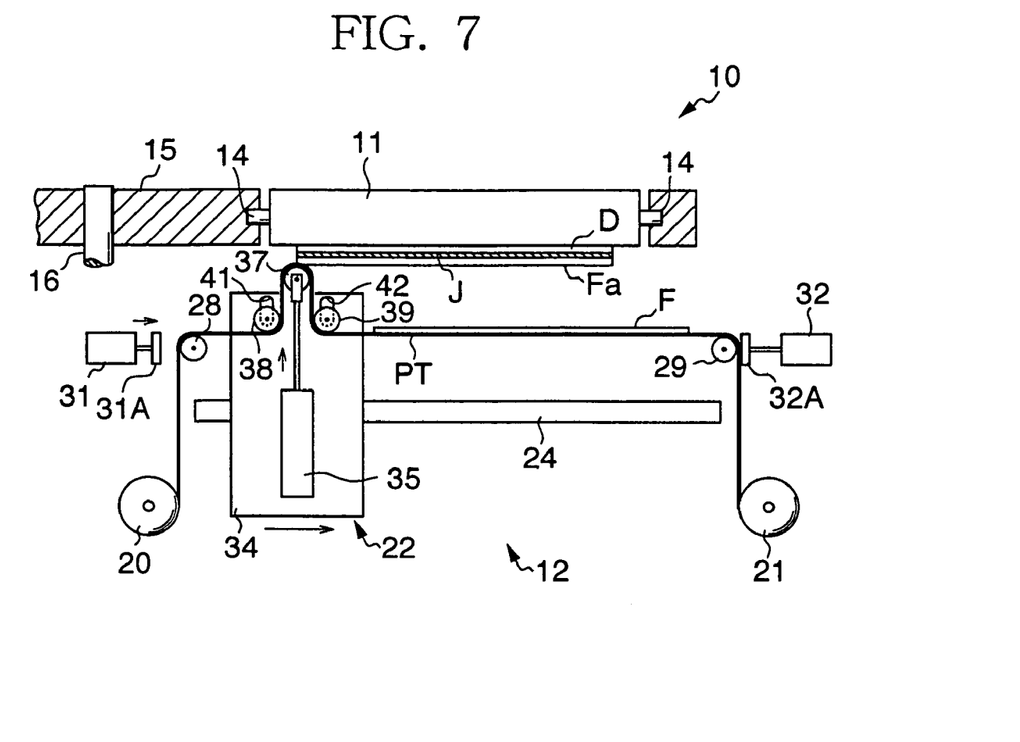
FIG. 7 is a front view showing an initial state in which the peeling tape has been attached to the second film.
Figure 8:
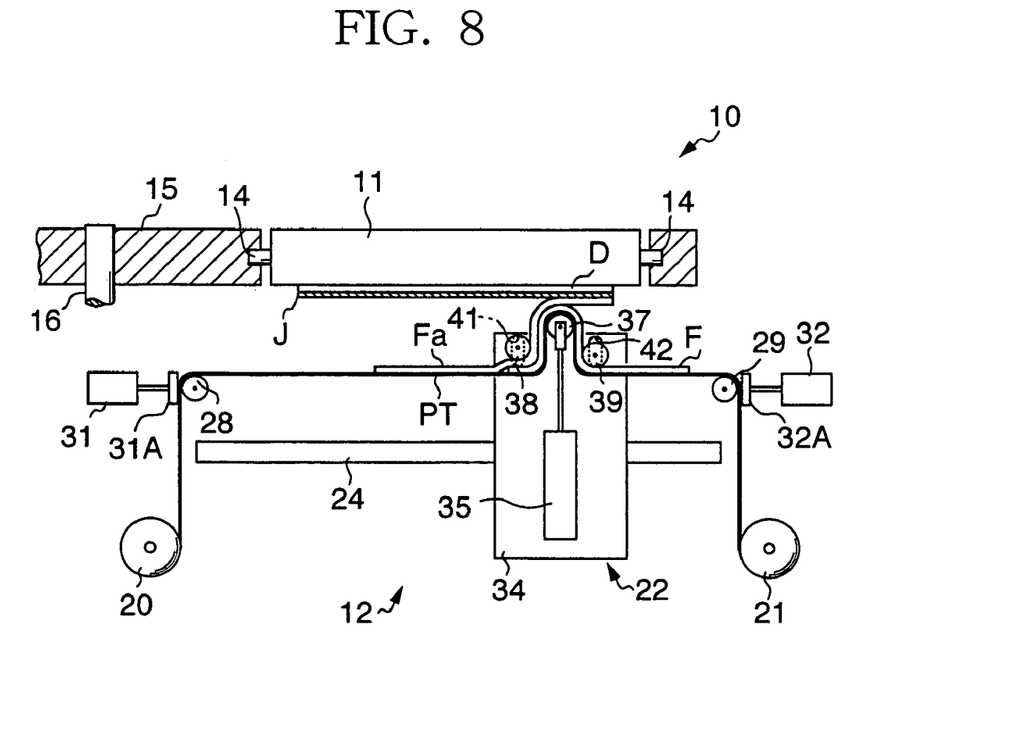
FIG. 8 is a front view showing an intermediate state of the peeling operation of the second film.
Figure 9:
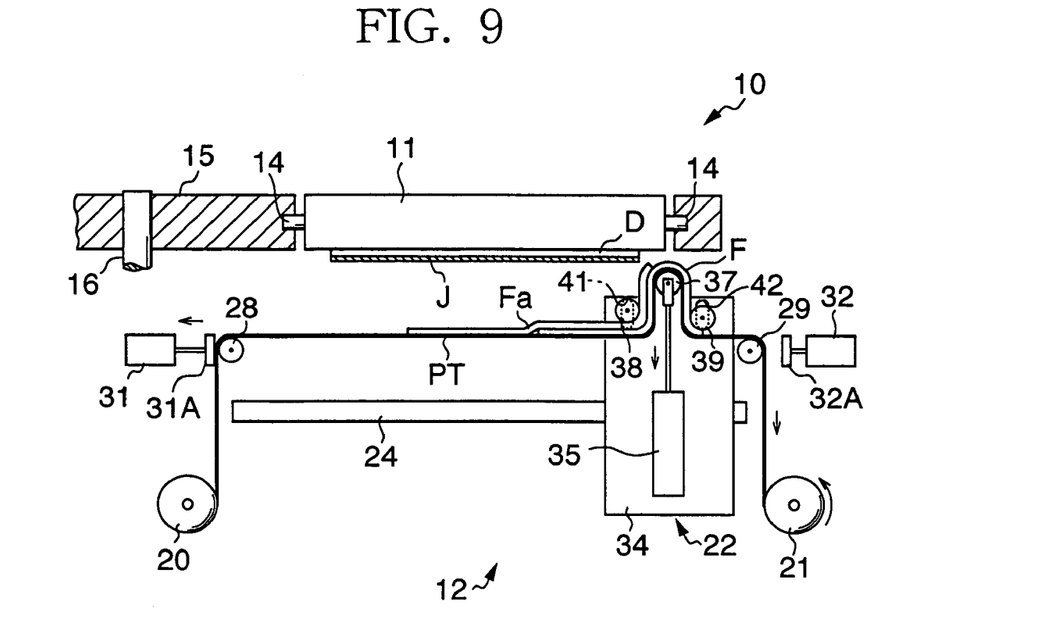
FIG. 9 is a front view showing a state immediately after the second film has been peeled off.
Figure 10:
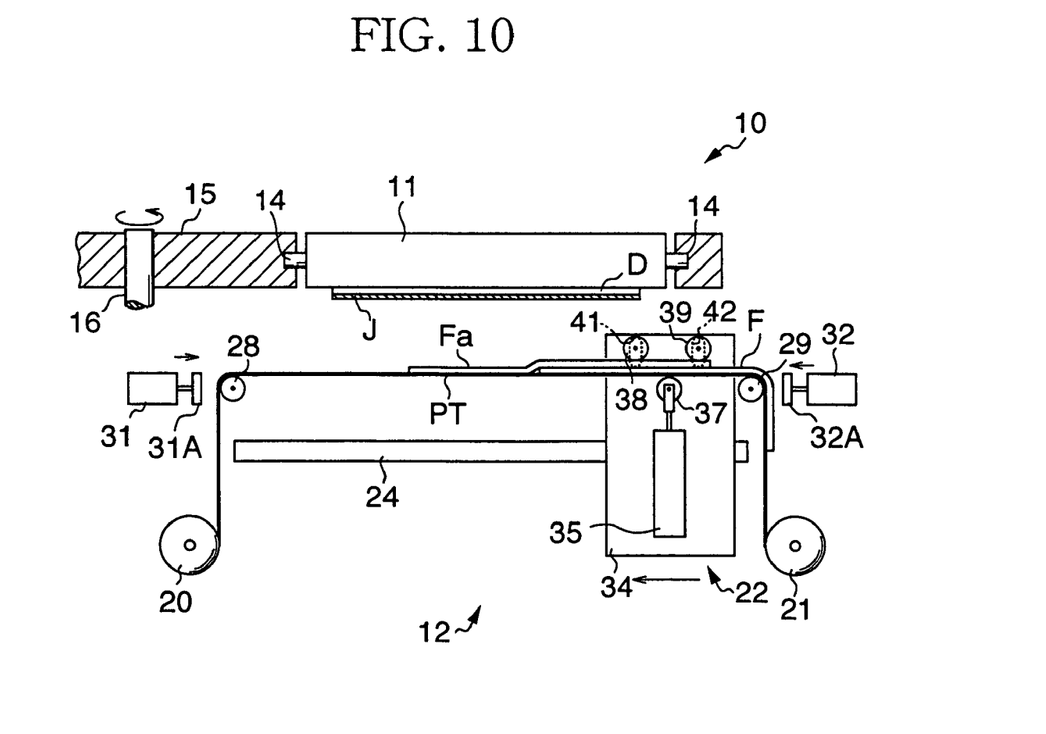
FIG. 10 is a front view showing a state in which the peeling tape has been laid substantially horizontal after the state shown in FIG. 9.

From this state, the peeling operation of the film F of the second object D starts. This peeling operation is carried out in substantially the same manner as that of the peeling operation of the above-described first film F except that attaching area of the film F and the peeling tape PT is different. That is, after releasing the nip of the peeling tape PT at the first guide roll 28, the first roll 37 is raised to press and attach the peeling tape PT to an area in one end side of the film F, which is not peeled off yet (hereinafter, given with a reference symbol Fa) (refer to FIG. 7). Owing to this, the area of the one end side of Fa and an area of the peeling tape PT adjacent to the one end side of the film F, which has been peeled off just beforehand (left side in FIG. 7), are attached to each other. In this state, the peeling tape PT is nipped with the first guide roll 28 and the cylinder 31 and the peeling head 22 is moved in the right direction in FIG. 7. And the peeling tape PT is paid out among the first roll 37, the second roll 28 and the third roll 39. Owing to this paying out operation, as shown in FIGS. 8 and 9, after the area of one end side of the film Fa is attached to the peeling tape PT, the film Fa is completely peeled off, while the area of one end side of the film F is overlapped with the area of the other end side of the film Fa. After that, after releasing the nip of the peeling tape PT at the second guide roll 29, the first roll 37 is lowered while winding the peeling tape PT with the winding roll 21 to make peeling tape PT substantially horizontal (refer to FIG. 10). At the same time, the index table 15 turns to set the peeling table 11, which is further sucking another object D, above the peeling head 22 (refer to FIG. 11). Then, after nipping the peeling tape PT at the first and second guide rolls 28 and 29 via the cylinders 31 and 32, the peeling head 22 is moved toward the left direction in FIG. 10.

Figure 11:
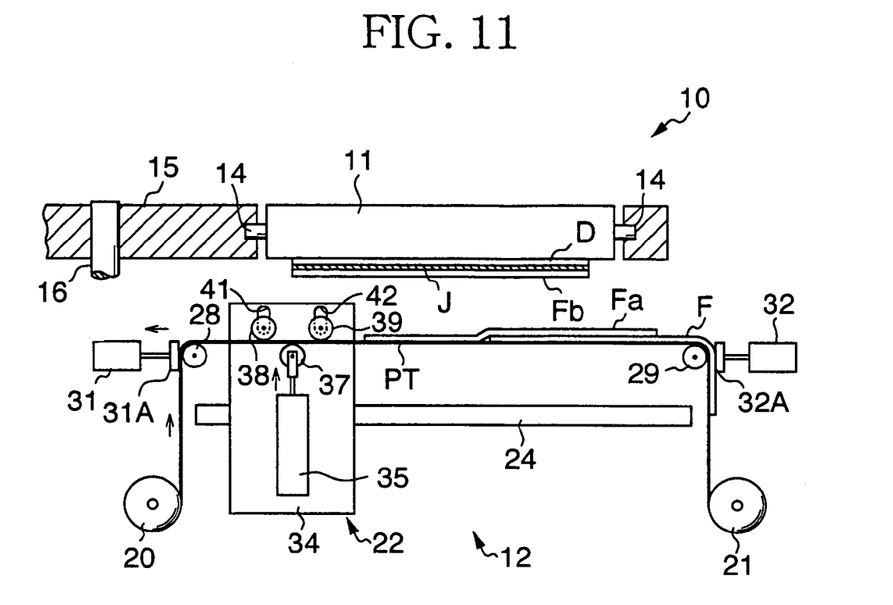
FIG. 11 is a front view showing a state in which the peeling apparatus is ready for peeling operation of the third film.
Figure 12:
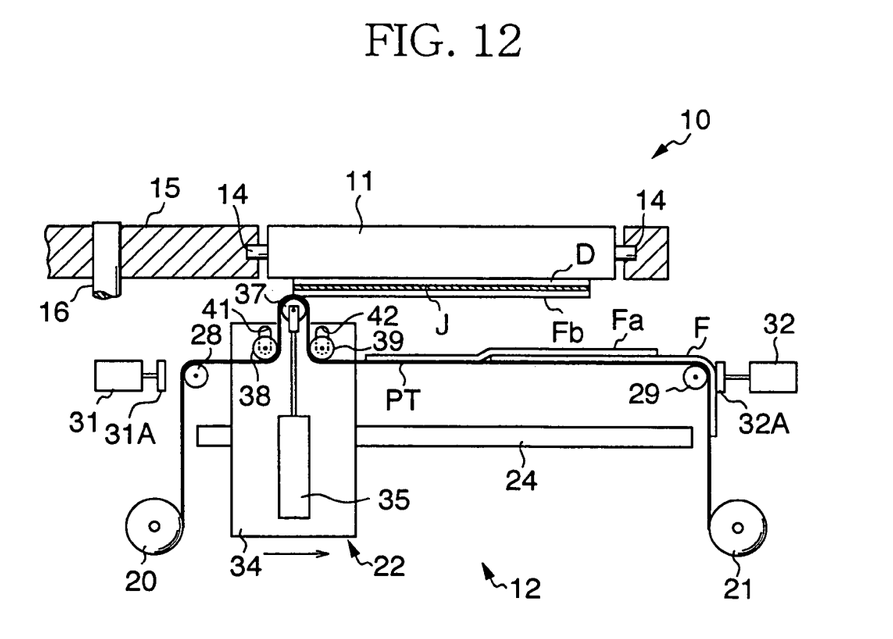
FIG. 12 is a front view showing an initial state in which the peeling tape has been attached to the third film.

Additionally, in the state shown in FIG. 11, the film F of the third object D (given with Fb in FIG. 11) is ready to be peeled off. From this state, the peeling operation of the film after the third film Fb onwards can be carried out in the same manner as the peeling operation of the second film Fa (refer to FIG. 12). Owing to this, each film F can be sequentially peeled off from plural objects D using a single peeling tape PT and wound with the winding reel 21.

In the above-described peeling operation of the film F, the second and third rolls 38 and 39 are arranged so as to press the peeling tape PT downward at the right and left sides of the first roll 37 while moving upward in accordance with the thickness of the peeling tape PT and the film F attached thereto.

Figure 13:
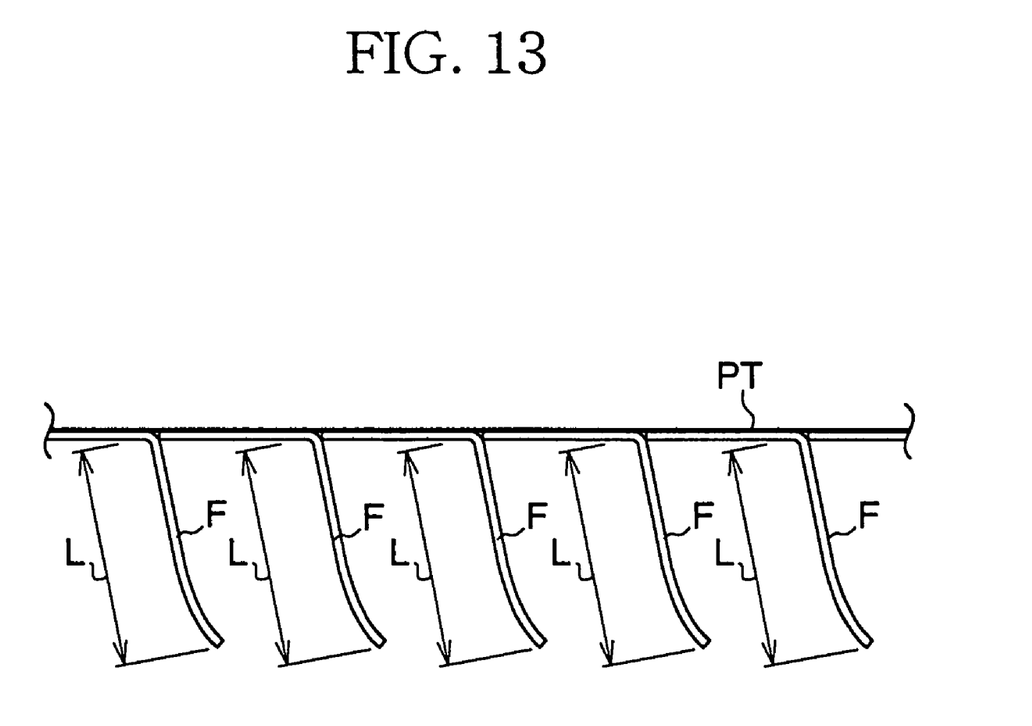
FIG. 13 is a front view showing a state in which the peeling tape is laid substantially horizontal.

Therefore, according to the embodiment, since the film F is peeled off from plural objects D while being overlapped with film F, which has been peeled off just beforehand, when the peeling tape PT wound on the winding reel 21 is oriented in the substantially horizontal direction, a state shown in FIG. 13 is obtained. That is, the film length L in FIG. 13 becomes an area where each film F is overlapped with each other. Accordingly, compared to the conventional method, waste of the peeling tape PT of the length equal to that obtained by multiplication of the length L by the number of peeled films F can be eliminated.

Although the best structure, method and the like for carrying out the present invention has been disclosed in the above description, the present invention is not limited thereto.

That is, the present invention has been illustrated and described mainly with respect to a particular embodiment. However, it is possible for ones skilled in the art to add various modifications to the above-described embodiment with respect to minute constitution such as configuration, quantity and the like without departing from the range of the technical spirit and object of the present invention.

For example, according to the embodiment, when peeling off the film F, the peeling head 22 is arranged to move without moving the peeling table 11. However, it may be arranged in such a way that the peeling table 11 is moved with respect to the peeling head 22 to allow a relative movement between the peeling head 22 and the peeling tape PT so that the peeling tape PT is paid out.

Also, paying-out of the peeling tape PT is arranged to be controllable by means of the first and second guide rolls 28 and 29 and the cylinders 31 and 32. However, as far as the same function as that of the above is obtained, various design changes can be made.

Further, the following arrangement may be employed. That is, such an arrangement can be adopted that by incorporating a heater in the first roll 37 and using a thermosensitive adhesive for the peeling tape PT, the peeling tape PT is attached to the film F while heating the peeling tape PT with the first roll 37.

INDUSTRIAL AVAILABILITY

The present invention is applicable to a peeling apparatus and a peeling method for sequentially peeling off films from plural objects using a peeling tape.

What is claimed is:

1. A peeling apparatus, comprising:
   a peeling table for supporting an object to be peeled off, a film being stuck thereto; and
   a peeling unit disposed opposite to the peeling table;
   said peeling apparatus being capable of sequentially peeling off each of films from plural objects by attaching a peeling tape paid out from the peeling unit to said film and thereby forwarding the same,
   wherein said peeling unit includes a peeling tape supply section, a peeling tape winding section and a peeling head relatively movable with respect to the peeling tape between the supply section and the winding section, and
   wherein said peeling head is arranged so as to move relatively with respect to the peeling tape, after attaching the peeling tape to an end area of the film so that the film is overlapped with a different film which has been peeled off just beforehand, and to be able to forward the film.

2. The peeling apparatus according to claim 1, wherein said peeling head is arranged, when peeling off a film, so as to be able to forward a peeling tape while moving from one end side toward the other end side of the film; and before the peeling off operation of the film, to move from the other end side toward the one end side of a different film, which has been peeled off just beforehand and to attach an adjacent peeling tape to the one end side of the film.

3. A peeling method, in which a peeling tape is attached to each of films stuck on plural objects to be peeled off and said each of films is sequentially peeled off, comprising the steps of:

attaching the peeling tape to an end area of said film using a peeling head; and thereafter causing said peeling head and the object to perform a relative movement to each other so that the film peeled off is overlapped with a different film peeled off just beforehand and forwarding the peeling tape to peel off the film from the object.

4. The peeling method according to claim 3, wherein, when peeling off said film, the peeling head moves from one end side to the other end side of the film to forward a peeling tape, before peeling off said film, the peeling head moves from the other end side to the one end side of said different film, which has been peeled off just beforehand, and subsequently the peeling head attaches the peeling tape adjacent to the one end side of said different film to the one end side of the film, which is not peeled off yet from the object.

* * * * *